United States Patent [19]

Hayashi et al.

[11] Patent Number: 5,762,684
[45] Date of Patent: Jun. 9, 1998

[54] TREATING LIQUID SUPPLYING METHOD AND APPARATUS

[75] Inventors: Toyohide Hayashi; Masaki Iwami, both of Kyoto, Japan

[73] Assignee: Dainippon Screen Mfg. Co., Ltd., Japan

[21] Appl. No.: 753,706

[22] Filed: Nov. 27, 1996

[30] Foreign Application Priority Data

| Nov. 30, 1995 | [JP] | Japan | 7-338234 |
| Nov. 30, 1995 | [JP] | Japan | 7-338235 |
| Nov. 30, 1995 | [JP] | Japan | 7-338236 |

[51] Int. Cl.⁶ ............ B01D 19/00; B01D 53/22
[52] U.S. Cl. ............ 95/24; 95/46; 96/6; 96/8; 55/216; 55/274
[58] Field of Search ............ 95/24, 46; 96/4, 96/6, 8, 10; 55/210, 215–219, 274

[56] References Cited

U.S. PATENT DOCUMENTS

| 3,255,575 | 6/1966 | Roberts | 95/24 |
| 3,751,879 | 8/1973 | Allington | 96/6 X |
| 4,986,837 | 1/1991 | Shibata | 96/8 X |
| 4,997,464 | 3/1991 | Kopf | 96/6 |
| 5,123,937 | 6/1992 | Shibata et al. | 95/46 |
| 5,205,844 | 4/1993 | Morikawa | 96/6 |
| 5,383,483 | 1/1995 | Shibano | 96/6 X |
| 5,522,917 | 6/1996 | Honda et al. | 95/46 |
| 5,584,914 | 12/1996 | Senoo et al. | 96/6 |

FOREIGN PATENT DOCUMENTS

| 1-063007 | 3/1989 | Japan | 96/6 |
| 1-315301 | 12/1989 | Japan | 95/46 |
| 3-169302 | 7/1991 | Japan | 95/46 |
| 4-171005 | 6/1992 | Japan | 95/46 |
| 4-349902 | 12/1992 | Japan | 95/46 |
| 5-049808 | 3/1993 | Japan | 96/6 |
| 5-200228 | 8/1993 | Japan | 96/8 |
| 6-182325 | 7/1994 | Japan | 95/46 |
| 6-182326 | 7/1994 | Japan | 95/46 |

*Primary Examiner*—Robert Spitzer
*Attorney, Agent, or Firm*—Ostrolenk, Faber, Gerb & Soffen, LLP

[57] ABSTRACT

A degassing module mounted in an intermediate position of a delivery pipe includes a fluid passage formed of a gas-permeable film material. The fluid passage is enclosed in a gas-tight vacuum chamber. A degassing pipe is connected to the vacuum chamber. The degassing pipe has a switch valve for breaking a communication between a sealed space in the vacuum chamber and a vacuum source, thereby forming a closed section including part of the degassing pipe and the sealed space in the vacuum chamber. A reduced quantity of solvent evaporates from a treating solution flowing through the fluid passage of the degassing module, and passes in the form of solvent vapor through the gas-permeable film material into the sealed space of the vacuum chamber. This minimizes change in the concentration and temperature of the treating solution flowing through the degassing module. The degassing pipe has a trap formed in an intermediate position thereof. A liquid level sensor detects the treating solution collected in a predetermined quantity in the trap. An alarm is given in response to a detection signal from the sensor. When the fluid passage of the degassing module is broken, the abnormality is detected reliably to avoid inconveniences due to a decrease in the degassing capability of the degassing module.

31 Claims, 3 Drawing Sheets

TREATING LIQUID SUPPLYING METHOD AND APPARATUS

BACKGROUND OF THE INVENTION

(1) Field of the Invention

This invention relates to methods and apparatus for supplying a treating liquid or solution, such as a developer, photoresist solution, or cleaning liquid, e.g. deionized water, to the surfaces, of substrates such as semiconductor wafers, glass substrates for liquid crystal displays (LCDs), glass substrates for photomasks, and substrates for optical disks.

(2) Description of the Related Art

For example, a photoresist film formed on the surface of a substrate, such as a semiconductor wafer or a glass substrate for an LCD, may be developed while the substrate is spun in a horizontal position about a vertical axis. A developer is supplied from a developer source to a discharge nozzle through a delivery pipe having a filter and the like, and then from the discharge opening of the nozzle to the substrate surface. To avoid, an unevenness in developing the developer is supplied in a controlled manner to spread uniformly over the entire substrate surface.

Air can be trapped inside the delivery pipe, or gas may be dissolved in the developer flowing through the delivery pipe. When the developer is supplied as it is from the discharge nozzle to the surface of the substrate, the gas in the developer adheres in the form of bubbles to the surface of the photoresist film on the substrate. As a result, the developing process is inhibited where bubbles are present, leading to a defective development. This problem is not limited to the developing process but may be encountered in various other types of processes. In a photoresist applying process, for example, an uneven application may be caused by a gas dissolved in a photoresist solution.

Figure 1:
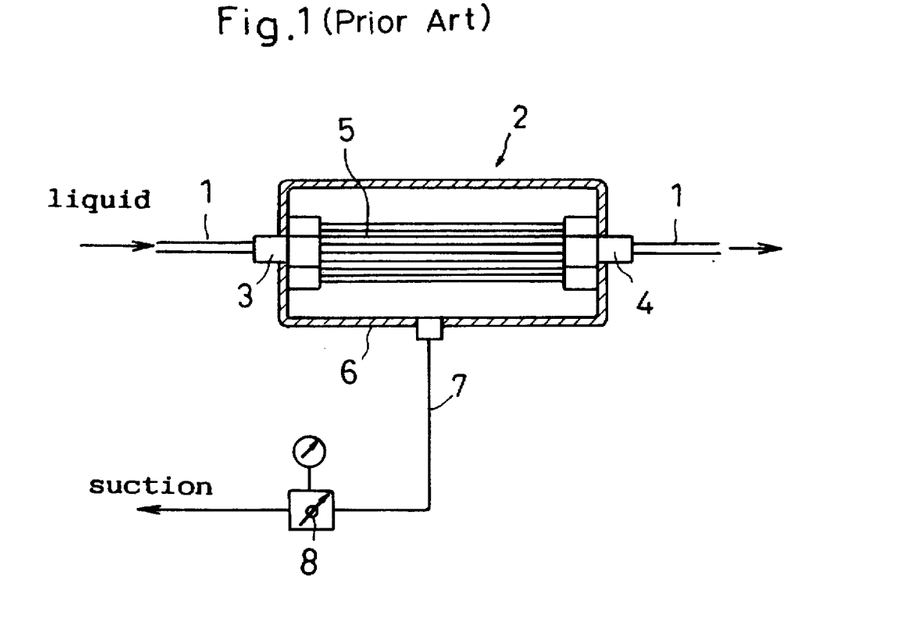
FIG. 1 is a schematic view showing a conventional example of treating solution supplying apparatus.

FIG. 1 shows a conventional construction for avoiding a processing deficiency due to air trapped in a delivery pipe or gas dissolved in a treating solution. As shown, a delivery pipe 1 extending from a solution source to a nozzle opening includes a degassing module 2 mounted in an intermediate position thereof. The degassing module 2 removes gas from the processing solution passing therethrough, whereby the treating solution having no gas dissolved therein is supplied from the nozzle opening to a substrate.

The degassing module 2 schematically shown in section in FIG. 1 includes an inlet coupling 3 and an outlet coupling 4 connected to the delivery pipe 1, a fluid passage 5 communicating at opposite ends thereof with the couplings 3 and 4, and a vacuum chamber 6 for enclosing the fluid passage 5 in a gas-tight state. The fluid passage 5 includes numerous thin tubes formed of a noncorrosive, gas-permeable film material, e.g. tetrafluoroethylene resin, and extending parallel to one another. The degassing module 2 has a degassing pipe 7 connected thereto to communicate with a sealed space in the vacuum chamber 6. The degassing pipe 7 is connected at the other end thereof to a vacuum source such as a vacuum pump or a vacuum line in a factory. The degassing pipe 7 may have a pressure regulator valve 8, as necessary, for adjusting a vacuum pressure for decompressing the interior of vacuum chamber 6.

When a treating solution or liquid such as a developer, photoresist solution or deionized cleaning water is supplied from a liquid source through the delivery pipe 1, the solution flows through the degassing module 2, and in particular through the fluid passage 5 including the numerous thin tubes formed of a gas-permeable film material. Then, a gas such as air dissolved in the treating solution is effectively extracted therefrom through the gas-permeable film material of the thin tubes into the sealed space of the vacuum chamber 6. In this way, the treating solution is promptly degassed while flowing continuously through the degassing module 2. The degassed treating solution is discharged from the outlet of degassing module 2 into the delivery pipe 1.

However, what is extracted from the treating solution, e.g. developer, flowing through the fluid passage 5 of the degassing module 2 is not only air dissolved therein but also part of a solvent such as water which passes as vapor through the gas-permeable film material forming the thin tubes and out into the sealed space of the vacuum chamber 6 in a decompressed state. The vapor, such as water vapor, is drawn through the degassing pipe 7 toward the vacuum source to be exhausted.

In the treating solution supplying apparatus shown in FIG. 1, the interior of vacuum chamber 6 is constantly in communication with the vacuum source to be in the compressed state. With the interior of vacuum chamber 6 remaining in communication with the vacuum source through the degassing pipe 7, the solvent such as water evaporates from the treating solution flowing through the fluid passage 5 of degassing module 2, and the solvent vapor such as water vapor continues to drain through the gas-permeable film material forming the thin tubes. Consequently, even though the treating solution is adjusted to a proper concentration at the solution source, the concentration of the treating solution changes (i.e. increases) since the solvent such as water is separated in vapor form from the treating solution flowing through the fluid passage 5 of degassing module 2. Further, the temperature of the treating solution flowing through the fluid passage 5 decreases as a result of a vaporization heat loss because of the evaporation of the solvent. Thus, the treating solution flowing from the outlet of degassing module 2 through the delivery pipe 1 to be supplied from the nozzle opening to the substrate surface fails to have a desired concentration and temperature, which results in defects in the treated substrate.

Further, while using the treating solution supplying apparatus as shown in FIG. 1, the thin tubes formed of a gas-permeable film material and constituting the fluid passage 5 of degassing module 2 could be damaged or broken as a result of change with time or by some other cause. When the thin tubes are broken, gas is not removed from the treating solution flowing through the degassing module 2. The treating solution is supplied, without being degassed, from the nozzle opening at the forward end of the delivery pipe 1 to the substrate surface. This causes inconveniences such as defective development and uneven coating. Such a condition continued with no remedial measure being taken results in a greatly reduced yield.

No practical method has existed heretofore of accurately grasping a decrease in the degassing capability of the degassing module 2. In one conceivable method, a dissolved nitrogen meter may be used in a position of the delivery pipe 1 downstream of the degassing module 2 for measuring a quantity of nitrogen gas dissolved in the treating solution. However, this method is unreliable.

Until the thin tubes formed of a gas-permeable film material and constituting the fluid passage 5 are broken, part of the solvent such as water contained in the treating solution flows out into the sealed space of the vacuum chamber 6 as noted hereinbefore. As a result, a trace quantity of liquid oozes from the sealed space of the vacuum chamber 6 into the degassing pipe 7 connected to the vacuum chamber 6 of degassing module 2. Conventionally, the liquid oozing out just flows through the degassing pipe 7 to the vacuum source such as a vacuum line in a factory. In a normal condition, the liquid oozes out in just a trace quantity to pose no serious problem. In an abnormal condition where, for example, the thin tubes formed of a gas-permeable film material and constituting the fluid passage 5 of degassing module 2 are damaged or broken as a result of change with time or by some other cause, a large quantity of treating solution flows through the degassing pipe 7 to the vacuum equipment to cause serious damage to the equipment. To protect the vacuum equipment, it is conceivable to use a relatively inexpensive ejector as the vacuum source. Then, a large quantity of gas/liquid mixture flows in an abnormal condition as noted above. This hampers a drain collecting operation, or requires a complicated collecting system.

SUMMARY OF THE INVENTION

This invention has been made having regard to the state of the art noted above, and is intended to solve the various problems inevitable with the conventional construction of a degassing module.

Specifically, it is a first object of this invention to provide a treating solution supplying method and apparatus which allow a reduced quantity of solvent vapor such as water vapor to pass through a gas-permeable film material into a sealed space in a vacuum chamber while a treating solution flows through a fluid passage of a degassing module, thereby minimizing variations in the concentration and temperature of the treating solution flowing through the degassing module.

A second object of this invention is to provide a treating solution supplying method and apparatus which enable a reliable detection of an abnormality such as damage to a fluid passage of a degassing module, thereby avoiding inconveniences due to a decrease in the capability of the degassing module.

A third object of this invention is to provide a treating solution supplying method and apparatus which, in time of damage to a fluid passage of a degassing module, for example, prevent a large quantity of treating solution flowing from the degassing module through a degassing pipe to vacuum equipment acting as a vacuum source, thereby protecting the equipment from damage.

The first object noted above is fulfilled by a treating solution supplying method for supplying a treating solution to an object under treatment, according to a first aspect of this invention, which comprises the steps of degassing the treating solution supplied through a delivery pipe by causing the treating solution to flow through a fluid passage in a degassing module mounted in an intermediate position of the delivery pipe, the fluid passage being formed of a gas-permeable film material and having an inlet and an outlet communicating with each other, the fluid passage being enclosed in a gas-tight vacuum chamber defining a sealed space communicating with a vacuum source through a degassing pipe; and switching the degassing pipe between a state of placing the sealed space in communication with the vacuum source and a state of placing the sealed space out of communication with the vacuum source at predetermined times while the treating solution is supplied to the object under treatment.

The above treating solution supplying method is suitably executed by a treating solution supplying apparatus for supplying a treating solution to an object under treatment, according to the first aspect of the invention, which comprises:

a delivery pipe for supplying the treating solution;

a degassing module mounted in an intermediate position of the delivery pipe and including a fluid passage formed of a gas-permeable film material and having an inlet and an outlet communicating with each other, the fluid passage being enclosed in a gas-tight vacuum chamber;

a degassing pipe for connecting a sealed space in the vacuum chamber to a vacuum source;

a valve mechanism mounted on the degassing pipe for breaking a communication between the sealed space and the vacuum source; and a valve controller for controlling opening and closure of the valve mechanism.

When the valve controller controls the valve mechanism mounted on the degassing pipe to break the communication between the sealed space and the vacuum source, a closed section is formed of the sealed space in the vacuum chamber and part of the degassing pipe upstream of the valve mechanism. A solvent such as water may evaporate from the treating solution flowing through the fluid passage of the degassing module, and pass in the form of solvent or water vapor through the gas-permeable film material into the sealed space of the vacuum chamber. However, the solvent in the treating solution does not evaporate into vapor in a quantity beyond the capacity of the closed section noted above. This minimizes change in the concentration and temperature of the treating solution passing the degassing module, thereby avoiding a defective quality due to change in the characteristics of the treating solution.

As the quantity of gas increases with passage of time, the vacuum pressure in the closed section lowers. Then, the valve controller opens the valve mechanism to communicate the sealed space in the vacuum chamber with the vacuum source. As a result, the vacuum pressure in the degassing pipe and vacuum chamber increases. When the vacuum pressure in the vacuum chamber reaches a predetermined level, the valve controller closes the valve mechanism to form the closed section again. This operation is thereafter repeated.

The switching between the state of communicating the sealed space in the vacuum chamber with the vacuum source and the state of breaking the communication (i.e. operation of the valve mechanism) may be carried out in response to variations in the vacuum pressure in the above closed section or based on predetermined periods of time.

That is, the sealed space in the vacuum chamber is placed in communication with the vacuum source (by opening the valve mechanism) when the vacuum pressure in the closed section falls below a predetermined level, and out of communication with the vacuum source (by closing the valve mechanism) to form the closed section when the vacuum pressure rises above a predetermined level.

The sealed space in the vacuum chamber may be placed in communication with the vacuum source (by opening the valve mechanism) when the vacuum pressure falls below a predetermined level, the valve mechanism being closed upon lapse of a predetermined time (set by a timer) from the time the communication is made (i.e. the valve mechanism is opened).

The switching may be made repeatedly to place the sealed space in communication with the vacuum source and out of communication with the vacuum source (by alternately opening and closing the valve mechanism) upon lapse of periods of time (set by a timer).

In the treating solution supplying method and apparatus according to the first aspect of the invention, the degassing pipe may include a pressure regulator valve mounted between the valve mechanism and the vacuum source for maintaining a vacuum pressure in the degassing pipe at a predetermined level. Then, a vacuum pressure inside the vacuum chamber in time of communication between the sealed space and the vacuum source is adjusted to a proper level.

According to this method and apparatus, the vacuum pressure in the degassing pipe between the vacuum chamber and pressure regulator valve and in the vacuum chamber is maintained at a predetermined level. The higher the vacuum pressure is inside the vacuum chamber, the greater degassing capability the degassing module has. However, when the vacuum pressure is too high so that the temperature of the treating solution flowing through the fluid passage is above a boiling point at that vacuum pressure, the treating solution flowing through the fluid passage will boil up and evaporate rigorously. This changes the characteristics of the treating solution such as concentration and temperature. Further, if the vacuum pressure in the vacuum chamber is too high, chattering (i.e. a phenomenon in which pressure repeats minute variations in extremely short cycles without attaining a steady value) may occur when the valve mechanism is operated as noted hereinbefore, which makes a precise control impossible. If the vacuum pressure in the vacuum chamber is low, the degassing module has a reduced degassing capability. Then, the treating solution is supplied to the surface of a substrate without being sufficiently degassed, resulting in a defective development as noted hereinbefore. Thus, the vacuum pressure in the vacuum chamber has a proper level, and the pressure may be adjusted to the proper level by the pressure regulator valve.

In the treating solution supplying method and apparatus according to the first aspect of the invention, the degassing pipe may include a trap disposed between the vacuum chamber and the valve mechanism for storing a liquid separated from a gas, and a drainpipe having a switch valve for draining the liquid from the trap. Then, an atmosphere drawn from the sealed space into the degassing pipe is separated into a gas and a liquid, the liquid being collected and periodically discharged.

With this method and apparatus, the atmosphere drawn from the sealed space in the vacuum chamber of the degassing module is separated into a gas and a liquid in the trap provided on the degassing pipe, and the liquid being is collected in the trap. Particularly when the valve mechanism is operated to break the communication between the sealed space in the vacuum chamber and the vacuum source as noted hereinbefore, the closed section of the degassing pipe adjacent the vacuum chamber and upstream of the valve mechanism receives an increased quantity of solvent vapor such as water vapor which tends to form dew. As the valve mechanism is opened and closed repeatedly, a relatively large quantity of liquid such as water collects in the trap. The switch valve mounted on the drainpipe is opened periodically to drain the liquid from the trap through the drainpipe.

The second object noted hereinbefore is fulfilled by a treating solution supplying method for supplying a treating solution to an object under treatment, according to a second aspect of this invention, which comprises the steps of degassing the treating solution supplied through a delivery pipe by causing the treating solution to flow through a fluid passage in a degassing module mounted in an intermediate position of the delivery pipe, the fluid passage being formed of a gas-permeable film material and having an inlet and an outlet communicating with each other, the fluid passage being enclosed in a gas-tight vacuum chamber defining a sealed space communicating with a vacuum source through a degassing pipe; monitoring an inflow of the treating solution from the sealed space to the degassing pipe while the treating solution is supplied to the object under treatment; and giving notice when the treating solution flows from the sealed space into the degassing pipe.

The above treating solution supplying method is suitably executed by a treating solution supplying apparatus for supplying a treating solution to an object under treatment, according to the second aspect of the invention, which comprises:

a delivery pipe for supplying the treating solution;

a degassing module mounted in an intermediate position of the delivery pipe and including a fluid passage formed of a gas-permeable film material and having an inlet and an outlet communicating with each other, the fluid passage being enclosed in a gas-tight vacuum chamber;

a degassing pipe for connecting a sealed space in the vacuum chamber to a vacuum source;

a detector for detecting an inflow of the treating solution from the vacuum chamber to the degassing pipe; and an alarm for notifying the inflow of the treating solution in response to a detection signal outputted from the detector.

When the gas-permeable film material forming the fluid passage of the degassing module is broken, for example, the treating solution flows from inside the vacuum chamber of the degassing module into the degassing pipe. The treating solution flowing into the degassing pipe is detected by the detector, and the alarm notifies the operator of the inflow of the treating solution to the degassing pipe. The operator stops the supply of the treating solution to the object under treatment. Inconveniences such as defective development and coating unevenness would occur if the treating solution were supplied to the object under treatment without being degassed. Such inconveniences are now avoided to prevent a reduction in yield.

In the treating solution supplying method and apparatus according to the second aspect of the invention, an emergency shutoff valve or valves may be mounted on the degassing pipe and/or the delivery pipe upstream of the degassing module, the emergency shutoff valve or valves being normally open and closable by the detection signal. When the treating solution flows from the sealed space into the degassing pipe, the sealed space may be placed out of communication with the vacuum source, and/or the treating solution is stopped flowing from the delivery pipe to the degassing module.

With this method and apparatus, when the detector detects an inflow of the treating solution to the degassing pipe, the emergency shutoff valve or valves mounted on the degassing pipe and/or the delivery pipe upstream of the degassing module is/are closed. Consequently, the treating solution entering the degassing pipe is prevented from flowing toward the vacuum source, and/or the treating solution is stopped flowing from a solution source through the delivery pipe to the degassing module, thereby stopping the inflow of the treating solution from the degassing module to the degassing pipe. In this way, an automatic control is effected to stop an inflow of a large quantity of treating solution from the degassing module through the degassing pipe to vacuum equipment acting as the vacuum source, to prevent damage to the equipment.

The third object noted hereinbefore is fulfilled by a treating solution supplying method for supplying a treating solution to an object under treatment, according to a third aspect of this invention, which comprises the steps of degassing the treating solution supplied through a delivery pipe by causing the treating solution to flow through a fluid passage in a degassing module mounted in an intermediate position of the delivery pipe, the fluid passage being formed of a gas-permeable film material and having an inlet and an outlet communicating with each other, the fluid passage being enclosed in a gas-tight vacuum chamber defining a sealed space communicating with a vacuum source through a degassing pipe; and separating an atmosphere drawn from the sealed space into the degassing pipe into a gas and a liquid, the liquid being collected, while the treating solution is supplied to the object under treatment.

The above treating solution supplying method is suitably executed by a treating solution supplying apparatus for supplying a treating solution to an object under treatment, according to the third aspect of the invention, which comprises:

a delivery pipe for supplying the treating solution;

a degassing module mounted in an intermediate position of the delivery pipe and including a fluid passage formed of a gas-permeable film material and having an inlet and an outlet communicating with each other, the fluid passage being enclosed in a gas-tight vacuum chamber;

a degassing pipe for connecting a sealed space in the vacuum chamber to a vacuum source; and a trap mounted in an intermediate position of the degassing pipe for separating from a gas and storing the treating solution flowing from the vacuum chamber into the degassing pipe, thereby to prevent the treating solution from flowing toward the vacuum source.

When the gas-permeable film material forming the fluid passage of the degassing module is broken, and the treating solution flows from inside the vacuum chamber of the degassing module into the degassing pipe, the treating solution flows into the trap mounted in the intermediate position of the degassing pipe. The solution is separated from a gas and collected in the trap. Thus, the treating solution entering the degassing pipe from the degassing module is prevented from flowing straight toward the vacuum source, thereby preventing damage to the equipment.

In the treating solution supplying method and apparatus according to the third aspect of the invention, the trap may include a liquid level detector for detecting the treating solution collected in a predetermined quantity therein, and a liquid level alarm for notifying, based on a detection signal outputted from the liquid level detector, that the treating solution has collected in the predetermined quantity in the trap. Then, whether the liquid collected has reached a predetermined quantity is detected, and notice is given upon detection of the liquid collected having reached the predetermined quantity.

With this method and apparatus, the liquid level detector detects the treating solution flowing from the degassing module into the degassing pipe and collected in the predetermined quantity in the trap. The liquid level alarm notifies this to the operator. Then, the operator knows that an abnormality has occurred in the degassing module, and stops the supply of the treating solution to the object under treatment. It is thus possible to avoid inconveniences such as defective development and coating unevenness occurring if the treating solution were supplied to the object under treatment without being degassed.

A drainpipe may be connected to a bottom of the trap for draining the treating solution collected in the trap, the drainpipe including a switch valve. Then, the liquid collected may be discharged periodically.

Even in a normal situation, a trace quantity of the solution may ooze from the vacuum chamber of the degassing module into the degassing pipe, or dew may be formed in the degassing pipe. Though the quantity of such solution is minimal, the solution may gradually collects in the trap over a long period of time. In the above method and apparatus, the switch valve mounted on the drainpipe connected to the bottom of the trap is opened to discharge the solution collected in the trap through the drainpipe. By periodically draining the solution from the trap, it is possible to avoid malfunctioning of the liquid level detector due to the solution collected in the trap in a normal situation. Thus, the liquid level detector reliably detects only an inflow of the treating solution to the trap in time of an abnormality.

In the treating solution supplying apparatus according to the first to third aspects of the invention, the inlet and the outlet of the fluid passage of the degassing module may be connected to the delivery pipe as follows.

The inlet and outlet may communicate with the delivery pipe through couplings secured to the vacuum chamber, respectively, the couplings being formed of a resin and secured to the vacuum chamber by welding or bonding.

The inlet and the outlet of the fluid passage may communicate with the delivery pipe through couplings, respectively, the couplings and connecting portions of the vacuum chamber being formed of a resin to be integral with each other.

The delivery pipe may include connection ends formed of a resin for connection to the vacuum chamber, the connection ends being welded or bonded directly to or formed integral with the inlet and the outlet of the fluid passage, respectively.

The conventional degassing module employs threaded couplings for connecting the fluid passage to the delivery pipe. Seal tape is applied to screws of the threaded couplings, and the couplings are screwed into female screws formed in connecting portions of the vacuum chamber, thereby to fix the couplings to the vacuum chamber. The threaded couplings for which seal tape is used have the disadvantage of tending to generate particles.

The threaded couplings and the connecting portions of the vacuum chamber may be formed of resin, and the threaded couplings may be screwed into the connecting portions of the vacuum chamber without using seal tape. This gives no possibility of particle generation, but is very likely to allow leakage from the sealed space in the vacuum chamber at the connecting portions.

Where the threaded couplings and the connecting portions of the vacuum chamber are formed of metal, the problem of leakage from the vacuum chamber may be alleviated. However, ions will precipitate from metal portions contacting the treating solution. The treating solution containing metallic ions will be supplied to substrate surfaces to impair processing results.

Where, as in this invention, the couplings and the connecting portions of the vacuum chamber are formed of a resin, the treating solution never contacts metals, and hence no possibility of ion precipitation into the treating solution. The delivery pipe and degassing module are interconnected by the couplings secured to the vacuum chamber by welding or bonding, or by the couplings and connecting portions of the vacuum chamber formed integral with each other, or by the connection ends of the delivery pipe welded or bonded directly to or formed integral with the vacuum chamber. Since no seal tape is used, there is no possibility of particle generation. Further, there is no likelihood of leakage from the vacuum chamber at the connections between the delivery pipe and vacuum chamber.

BRIEF DESCRIPTION OF THE DRAWINGS

For the purpose of illustrating the invention, there are shown in the drawings several forms which are presently preferred, it being understood, however, that the invention is not limited to the precise arrangements and instrumentalities shown.

DESCRIPTION OF THE PREFERRED EMBODIMENTS

Preferred embodiments of the invention will be described in detail hereinafter with reference to the drawings.

First Embodiment

Figure 2:
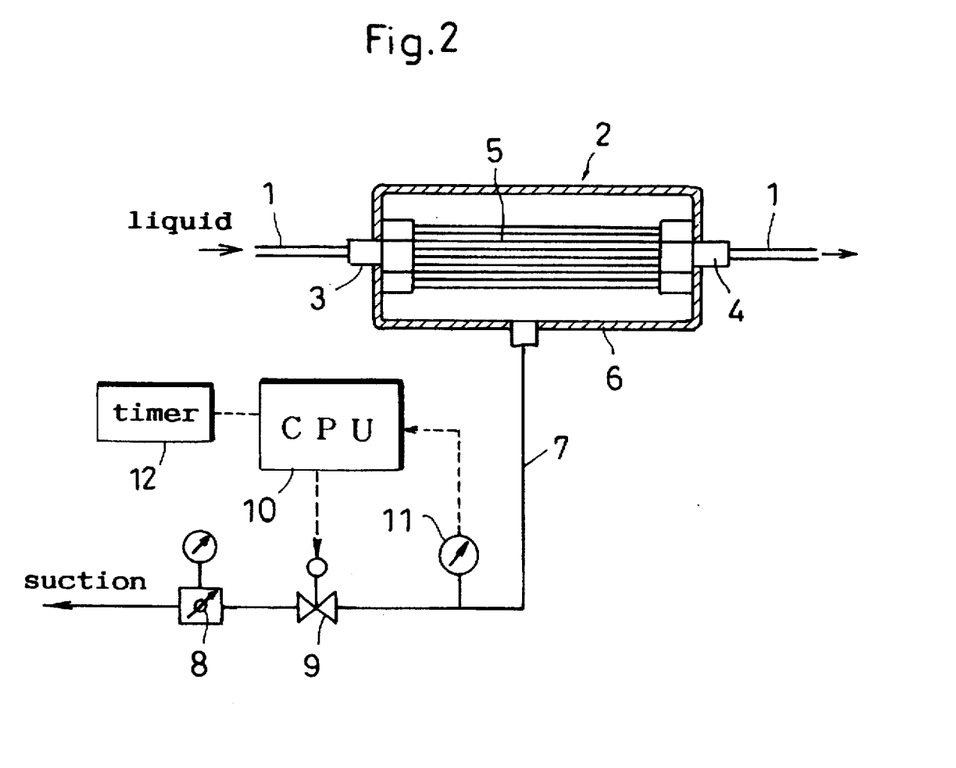
FIG. 2 is a first embodiment of a schematic view of a treating solution supplying apparatus of the present invention.

FIG. 2 is a schematic view of a treating solution supplying apparatus of the first embodiment of the present invention.

In the illustrated apparatus, a delivery pipe 1 extending from a solution source (not shown) to a nozzle opening (not shown) for supplying a treating solution includes a degassing module 2 mounted in an intermediate position thereof. The degassing module 2 has a vacuum chamber 6 defining a sealed space communicating with a degassing pipe 7 connected to a vacuum source. The delivery pipe 1 communicates with a fluid passage 5 in the degassing module 2 through an inlet coupling 3 and an outlet coupling 4. The above construction is the same as the conventional treating solution supplying apparatus shown by FIG. 1, and the treating solution is degassed in the same way as in the conventional apparatus. Thus, no detailed description thereof needs to be repeated. The degassing module is not limited to the construction noted above, but may be modified as long as it is capable of a similar degassing action. The above description of the degassing module 2 is applicable to the other embodiments described herein.

This treating solution supplying apparatus includes an air switch valve 9 mounted on the degassing pipe 7. The air switch valve 9 is operable under control of a CPU 10. When the air switch valve 9 is opened, the sealed space of vacuum chamber 6 of degassing module 2 communicates with the vacuum source through the degassing pipe 7. When the air switch valve 9 is closed, the communication between the sealed space of vacuum chamber 6 and the vacuum source is broken. The degassing pipe 7 further includes a pressure gauge 11 connected between the vacuum chamber 6 of degassing module 2 and the air switch valve 9. The CPU 10 has a timer 12 connected thereto.

The controls for opening and closing the air switch valve 9 in this treating solution supplying apparatus are carried out as follows.

With the air switch valve 9 opened, the vacuum chamber 6 of degassing module 2 is decompressed through the degassing pipe 7. When the interior of vacuum chamber 6 reaches a predetermined vacuum pressure, the air switch valve 9 is closed. The closure of the air switch valve 9 on the degassing pipe 7 breaks the communication between the sealed space in the vacuum chamber 6 of degassing module 2 and the vacuum source. As a result, a closed section is formed which includes the sealed space in the vacuum chamber 6 and the portion of the degassing pipe 7 upstream of the air switch valve 9. Water may evaporate from the treating solution, e.g. a developer, flowing through the fluid passage 5 of degassing module 2, and pass in the form of water vapor through the gas-permeable film material of the thin tubes into the sealed space of vacuum chamber 6. However, the water in the developer does not evaporate into water vapor in a quantity beyond the capacity of the closed section noted above. This minimizes change in the concentration and temperature of the developer passing the degassing module 2.

As the quantity of gas increases with the passage of time, the vacuum pressure in the closed section gradually lowers. The vacuum pressure in the closed section is monitored by the pressure gauge 11. When the vacuum pressure between the sealed space in the vacuum chamber 6 and the air switch valve 9 falls below a predetermined level, CPU 10 transmits a control signal to the air switch valve 9 to open in response to a signal from the pressure gauge 11. The vacuum pressure level for opening the air switch valve 9 is set so that the degassing capability of the degassing module 2 is maintained above a fixed level. The vacuum pressure in the degassing pipe 7 and vacuum chamber 6 increases when the air switch valve 9 is opened to communicate the sealed space of vacuum chamber 6 with the vacuum source. Upon lapse of a time set by the timer 12, e.g. several seconds, from a point of time at which the air switch valve 9 is opened, the air switch valve 9 is closed again by a control signal from CPU 10. During the several seconds from opening of the air switch valve 9 to closure thereof, the vacuum pressure inside the vacuum chamber 6 increases to a predetermined level. The above operation is thereafter repeated.

Instead of providing the timer 12, the pressure gauge 11 may be adapted to detect an upper limit as well as a lower limit of vacuum pressure and output corresponding signals. When the pressure gauge 11 detects a vacuum pressure in the degassing pipe 7 below a predetermined level, the air switch valve 9 may be opened by a control signal from CPU 10. When the pressure gauge 11 detects a vacuum pressure in the degassing pipe 7 above a predetermined level, the air switch valve 9 may be closed by a control signal from CPU 10. In this way, the air switch valve 9 may be opened and closed repeatedly. Further, instead of opening and closing the air switch valve 9 based on the measurement by the pressure gauge 11, the air switch valve 9 may be alternately opened and closed upon lapse of predetermined periods of time set by the timer 12. For example, the air switch valve may be opened for several seconds after one hour of its closure, closed again for one hour, and then opened for several seconds.

In the apparatus shown in FIG. 2, the degassing pipe 7 includes a pressure regulator valve 8 mounted between the air switch valve 9 and the vacuum source. The pressure regulator valve 8 may be installed only as necessary. For example, a vacuum pressure in a vacuum line in a factory acting as the vacuum source may be too high, so that the temperature of the developer flowing through the fluid passage 5 of degassing module 2 is above a boiling point at that vacuum pressure. Then, the developer flowing through the fluid passage 5 will boil up unless the vacuum pressure is adjusted. In another situation, chattering may occur when the air switch valve 9 is opened and closed, which the control difficult. Such inconveniences may be avoided by the pressure regulator valve 8 mounted on the degassing pipe 7 to adjust the vacuum pressure in the degassing pipe 7 and vacuum chamber 6 to a proper level.

When the air switch valve 9 is closed to break the communication between the sealed space in the vacuum chamber 6 of degassing module 2 and the vacuum source as noted hereinbefore, the closed section of the degassing pipe 7 adjacent the vacuum chamber 6 and upstream of the air switch valve 9 receives an increased quantity of water vapor passing through the gas-permeable film material of the thin tubes into the sealed space through the gaseous penetration film material of the thin tubes. Thus, the water vapor tends to form dew in the closed section. As the air switch valve 9 is opened and closed repeatedly, a relatively large quantity of water collects in the degassing pipe 7. A mechanism for draining such water from the vacuum suction system may be provided as in a second embodiment schematically shown in FIG. 3.

Second Embodiment

Figure 3:
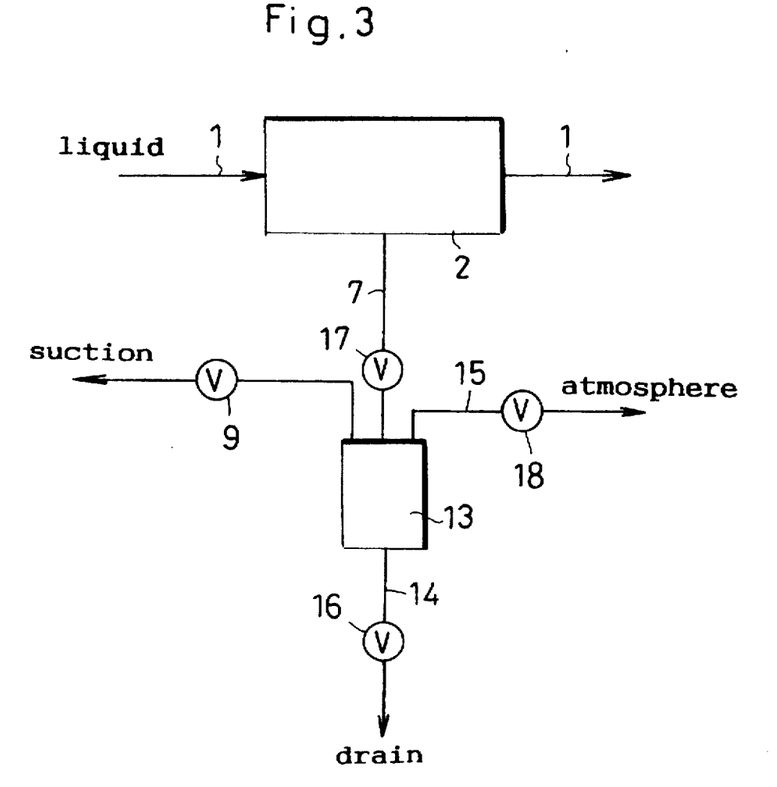
FIG. 3 is a schematic view of a second embodiment of an apparatus of the present invention.

The treating solution supplying apparatus shown in FIG. 3 includes a trap tank 13 in communication with the degassing pipe 7 between the vacuum chamber of degassing module 2 and the air switch valve 9 for storing water separated from gas. A drain pipe 14 is connected to a bottom of trap tank 13 for discharging the water therefrom. A pipe 15 opening to the atmosphere is connected to an upper part of trap tank 13. The drain pipe 14 has a drain valve 16. A shutoff valve 17 is mounted on the degassing pipe 7 between the trap tank 13 and the vacuum chamber of degassing module 2. The pipe 15 has a relief valve 18. The drain valve 16 and relief valve 18 are normally closed while the shutoff valve 17 is normally opened.

Water condensed in the degassing pipe 7 during operation of the apparatus flows into the trap tank 13. As the air opening valve 9 is repeatedly opened and closed, a relatively large quantity of water collects in the trap tank 13. The water collecting in the trap tank 13 is drained periodically from the vacuum suction system.

When draining the water, the shutoff valve 17 is closed and the drain valve 16 and relief valve 18 are opened. The water collecting in the trap tank 13 is thereby discharged outside through the drain pipe 14. When the water has been discharged, the drain valve 16 and relief valve 18 are closed and the shutoff valve 17 is opened again.

Instead of providing the trap tank 13 and the like as shown in FIG. 3, part of the degassing pipe may be bent to a U-shape, for example, to act as a trap portion. The shutoff valve 17 may be disposed on the drain pipe 14 between trap tank 13 and drain valve 16, with a relief pipe branching from the drain pipe 14 between shutoff valve 17 and drain valve 16, and the relief valve 18 mounted on the relief pipe. It may arrange atmosphere opening valve 18 during the pipe for this atmosphere opening. The operation for switching the drain valve 16, shutoff valve 17 and relief valve 18 may be carried out automatically or manually.

Third Embodiment

Figure 4:
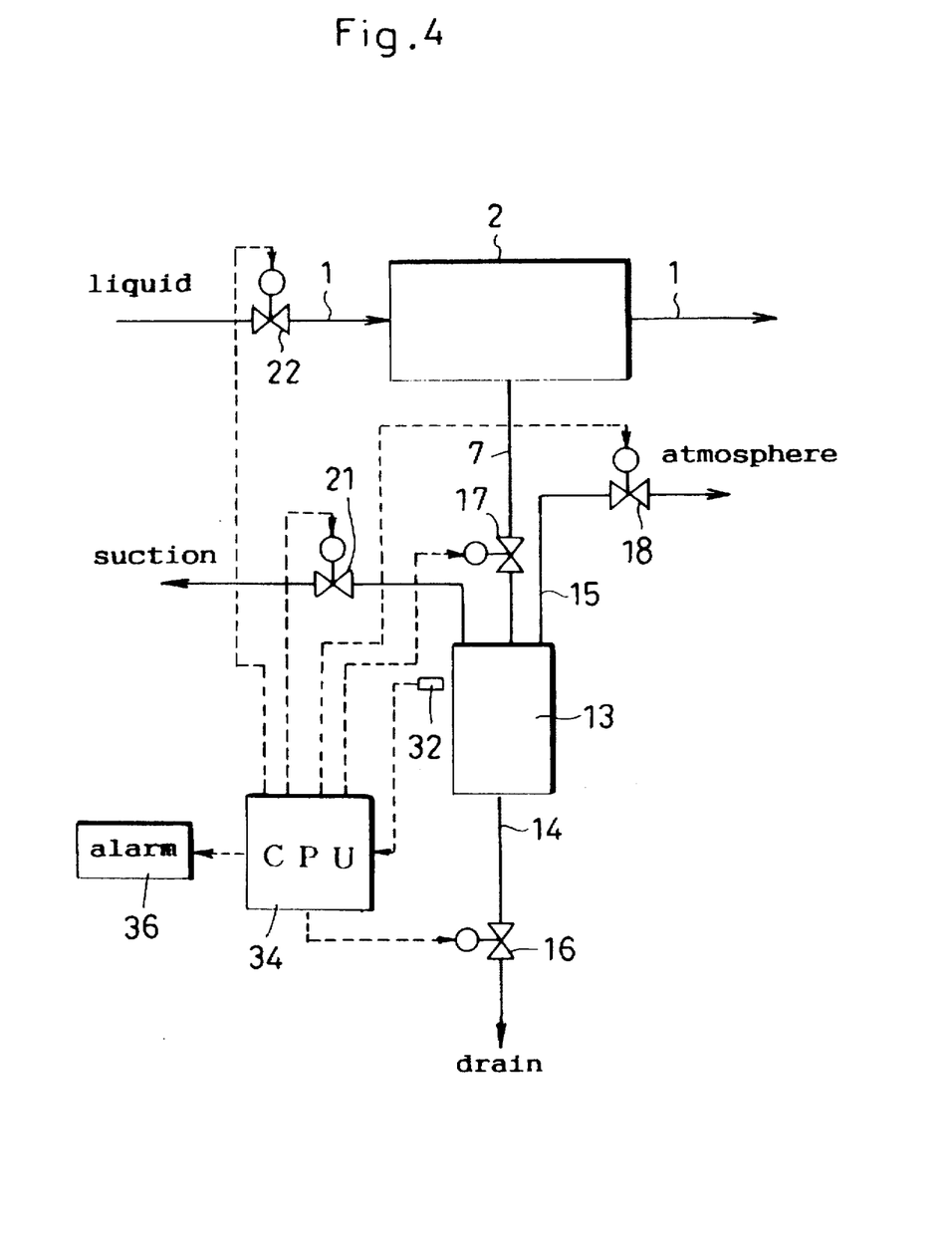
FIG. 4 is a schematic view of a third embodiment of an apparatus of the present invention.

FIG. 4 is a schematic view of a third embodiment of the apparatus of the present invention.

In the illustrated apparatus, the degassing pipe 7 includes a trap tank 13 for collecting a liquid separated from a gas. The degassing pipe 7 further includes an emergency shutoff valve 21 mounted between the trap tank 13 and the vacuum shutoff valve 21 is normally open but is closed in the case of an emergency or an abnormal condition. The delivery pipe 1 also includes an emergency shutoff valve 22 normally open but closed in the case of an emergency of an abnormal condition. Such an emergency shutoff valve may be provided for only one of either the degassing pipe 7 or the delivery pipe 1.

A drainpipe 14 is connected to a bottom of trap tank 13 for discharging the liquid therefrom. The drainpipe 14 has a drain valve 16. A pipe 15 opening to the atmosphere is connected to an upper part of trap tank 13. The pipe 15 has a relief valve 18. A shutoff valve 17 is mounted on the degassing pipe 7 between the trap tank 13 and the vacuum chamber of degassing module 2.

The trap tank 13 has a liquid level sensor 32 for detecting a predetermined quantity of treating solution collected therein. The liquid level sensor 32 may be of the float switch type, photoelectric type or capacitance type. A detection signal outputted from the liquid level sensor 32 is transmitted to a CPU 34. The emergency shutoff valves 21 and 22, drain valve 16, relief valve 18 and shutoff valve 17 are operable under control of CPU 34. An alarm 36 is connected to CPU 34 for notifying, based on the detection signal from the liquid level sensor 32, that the predetermined quantity of treating solution has collected in the trap tank 13.

In the treating solution supplying apparatus shown in FIG. 4, the degassing module 2 includes a fluid passage having thin tubes formed of a gas-permeable film material. An operation carried out when the thin tubes are broken will be described next.

Normally, the emergency shutoff valves 21 and 22 and shutoff valve 17 are open, and the drain valve 16 and relief valve 18 are closed. When the thin tubes of the fluid passage of degassing module 2 are broken, the treating solution leaks from the broken tubes and flows from the vacuum chamber of degassing module 2 into the degassing pipe 7. The treating solution entering the degassing pipe 7 flows into the trap tank 13. In the trap tank 13, the solution is separated from gas and collected therein. Consequently, only the gas is drawn to the vacuum source, and the treating solution entering the degassing pipe 7 never flows to the vacuum source.

When the treating solution flowing from the degassing module 2 into the degassing pipe 7 is collected to the predetermined quantity in the trap tank 13, the liquid level sensor 32 detects this level and transmits the detection signal to CPU 34. Then, CPU 34 transmits a signal to the alarm 36 whereby the alarm 36 is actuated to notify an emergency situation to the operator. At the same time, CPU 34 transmits a control signal to the emergency shutoff valves 21 and 22 to close these valves. This breaks the communication between the vacuum source and the vacuum chamber of degassing module 2, and stops the treating solution flowing from the solution source through the delivery pipe 1 to the degassing module 2. Thus, the treating solution stops flowing from the degassing module 2 into the degassing pipe 7. Prompted by the alarm 36, the operator stops the operation of the treating solution supplying apparatus.

When the treating solution supplying apparatus stops operating, the shutoff valve 17 is closed and the relief valve 18 and drain valve 16 are opened. As a result, the treating solution having collected in the trap tank 13 is discharged through the drainpipe 14. Necessary steps are then taken to correct the situation, such as replacing the damaged degassing module 2 with a new one. When the draining operation is completed, the drain valve 16 and relief valve 18 are closed and the shutoff valve 17 opened again. The emergency shutoff valves 21 and 22 are restored to their original operating conditions, and the operation of the treating solution supplying apparatus is resumed.

In a normal operation, a trace quantity of the solution may ooze from the vacuum chamber of degassing module 2 into the degassing pipe 7, or dew may be formed in the degassing pipe 7. In this way, the solution may gradually collect in the trap tank 13 over a long period of time. In such a case, the relief valve 18 and drain valve 16 should be opened periodically to discharge the solution collected in the trap tank 13 through the drainpipe 14. The liquid level sensor 32 never operates due to the solution collected in the trap tank 13 in a normal situation. Thus, the liquid level sensor 32 reliably detects only an inflow of the treating solution to the trap tank 13 in time of an abnormality.

In the apparatus shown in FIG. 4, the trap tank 13 may be replaced by a U-shaped bend of the degassing pipe acting as a trap. The degassing pipe 7 may be branched at an intermediate position from the drainpipe 14 to separate the treating solution from the gas, so that the drainpipe 14 upstream of the drain valve 16 acts as a trap. In this case, the liquid level sensor 32 detects the treating solution collected in the drainpipe 14. The operation for switching the drain valve 16, shutoff valve 17 and relief valve 18 may be carried out manually, not automatically. Instead of operating the emergency shutoff valves 21 and 22 by a signal from CPU 34, the operator may, in response to operation of the alarm 36, manually close a switch valve mounted on the delivery pipe 1 or degassing pipe 7. The liquid level sensor 32 and drainpipe 14 may be omitted unless they are essential.

The apparatus in the third embodiment described above has the trap tank 13 provided at the degassing pipe 7 to prevent the treating solution from flowing to the vacuum source. Instead of providing a trap such as the trap tank on the degassing pipe, only a sensor may be provided for detecting the treating solution entering the degassing pipe from the vacuum chamber of the degassing module. The alarm may be operable simply by a detection signal outputted from this sensor. In this case, the operator, in response to an alarm, manually closes a switch valve mounted on the delivery pipe or degassing pipe. Alternatively, an emergency shutoff valve mounted on the delivery pipe or degassing pipe may be closed automatically by the detection signal outputted from the sensor.

In the construction shown in FIG. 4, the emergency shutoff valve 21 may, in a normal situation, be opened and closed repeatedly at predetermined times as is the air switch valve 9 in the first embodiment.

Specifically, the construction shown in FIG. 4 may be modified to include a pressure gauge connected to the degassing pipe 7 between the vacuum chamber of degassing module 2 and the emergency shutoff valve 21, and/or a timer connected to CPU 34. Normally (i.e. in the absence of a detection signal from the liquid level sensor 32), CPU 34 repeatedly opens and closes the emergency shutoff valve 21 as in the first embodiment, based on a signal from the pressure gauge and/or time set by the timer. During the normal time, the liquid collected in the trap tank 13 may be discharged therefrom periodically.

In time of an abnormality, i.e. when the fluid passage of degassing module 2 is broken and the liquid level sensor 32 detects an inflow of the treating solution into the degassing pipe 7 and gives a detection signal to CPU 34, CPU 34 causes the alarm 36 to give a warning, and closes the emergency shutoff valves 21 and 22. Then, the solution collected in the trap tank 13 is discharged.

With this construction and under normal operating conditions a reduced quantity of solvent evaporates from the treating solution flowing through the fluid passage of degassing module 2, and passes in the form of solvent vapor through the gas-permeable film material into the sealed space of the vacuum chamber. This minimizes change in the concentration and temperature of the treating solution flowing through the degassing module 2.

In time of an abnormality such as when the fluid passage of degassing module 2 is broken, the abnormality is detected to avoid inconveniences due to a decrease in the degassing capability of degassing module 2. The vacuum equipment may be protected from damage by preventing a large quantity of treating solution from flowing from the degassing module 2 through the degassing pipe 7 to the vacuum equipment.

Figure 5:
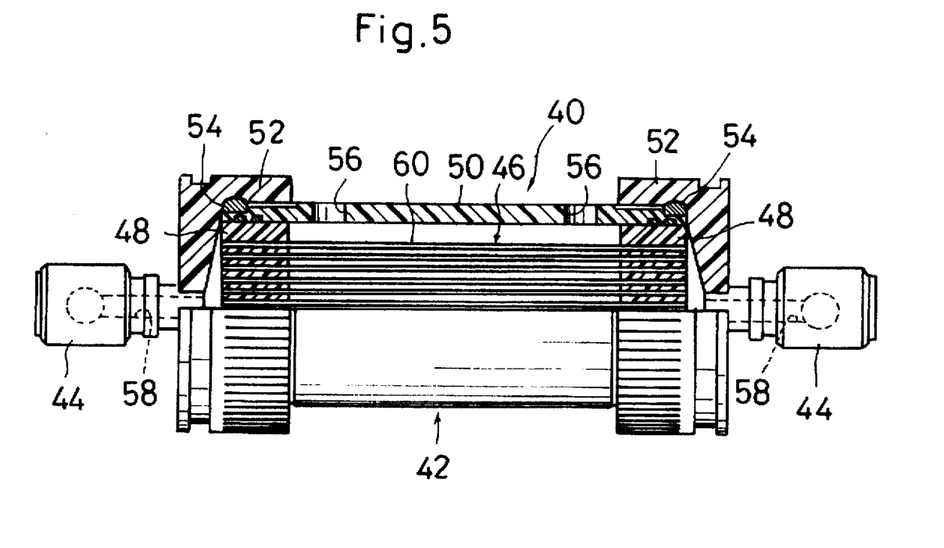
FIG. 5 is a front view of a modified degassing module applicable to the first to third embodiments, with an upper half shown in vertical cross section.

In the first to third embodiments described above, the inlet and outlet of the fluid passage of degassing module 2 may be connected to the delivery pipe 1 as shown in FIG. 5.

FIG. 5 is a front view of a modified degassing module applicable to the first to third embodiments, with an upper half shown in vertical cross section.

This degassing module 40 includes a vacuum chamber 42, inlet and outlet couplings 44 fixed to opposite ends of the vacuum chamber 42, a fluid passage 46 provided in the vacuum chamber 42, a pair of holders 48 for holding opposite ends of the fluid passage 46 and for fixing the fluid passage 46 inside the vacuum chamber 42.

The vacuum chamber 42 includes a cylindrical body 50 and a pair of end caps 52. Each cap 52 fits tight on a peripheral surface of the cylindrical body 50 through an O-ring 54. The cylindrical body 50 and caps 52 are formed of resins. For example, the cylindrical body 50 is formed of a polyolefin such as polypropylene. The caps 52 are formed of tetrafluoroethylene resin. The cylindrical body 50 defines connecting bores 56 for communication with the degassing pipe (see reference 7 in FIG. 1), with female screws cut in the bores 56.

The couplings 44 are also formed of a noncorrosive resin such as tetrafluoroethylene resin, and have treating solution passages 58 formed therein to communicate with a delivery pipe (see reference 1 in FIG. 1). Each coupling 44 has a tip end tightly fitted in an opening formed centrally in one of the caps 52 of vacuum chamber 42, and secured to the cap 52 by welding. Each coupling 44 may be by an adhesive to one of the caps 52 of vacuum chamber 42.

The fluid passage 46 includes numerous thin tubes 60 formed of a noncorrosive, gas-permeable film material, e.g. tetrafluoroethylene resin, and extending parallel to one another. The holders 48 holding the opposite ends of the fluid passage 46 and fixing the fluid passage 46 inside the vacuum chamber 42 are formed of a polyurethane resin, and have outer peripheral surfaces thereof in gas-tight contact with inner peripheral surfaces of the cylindrical body 50 of vacuum chamber 42.

While the couplings 44 are described as being secured to the caps 52 of vacuum chamber 42 by welding or an adhesive, the couplings and the caps of the vacuum chamber may be integrated into a unit. The delivery pipe may have coupling ends formed of a resin and directly welded or bonded to the caps of the vacuum chamber. Further, the coupling ends of the delivery pipe and the caps of the vacuum chamber may be formed of a resin so as to be integral with each other.

The present invention may be embodied in other specific forms without departing from the spirit or essential attributes thereof and, accordingly, reference should be made to the appended claims, rather than to the foregoing specification, as indicating the scope of the invention.

What is claimed is:

1. A treating solution supplying method for supplying a treating solution to an object under treatment, comprising the steps of: degassing said treating solution supplied through a delivery pipe by causing said treating solution to flow through a fluid passage in a degassing module mounted in an intermediate position of said delivery pipe, said fluid passage being formed of a gas-permeable film material and having an inlet and an outlet communicating with each other, said fluid passage being enclosed in a gas-tight vacuum chamber defining a sealed space communicating with a vacuum source through a degassing pipe; and switching said degassing pipe between a state of placing said sealed space in communication with said vacuum source and a state of placing said sealed space out of communication with said vacuum source at predetermined times while said treating solution is supplied to said object under treatment.

2. A treating solution supplying method as defined in claim 1, wherein a vacuum pressure in said sealed space is monitored, and switching is made repeatedly to place said sealed space in communication with said vacuum source when said vacuum pressure falls below a predetermined lower limit, and out of communication with said vacuum source when said vacuum pressure rises above a predetermined upper limit.

3. A treating solution supplying method as defined in claim 1, wherein a vacuum pressure in said sealed space is monitored, and switching is made repeatedly to place said sealed space in communication with said vacuum source when said vacuum pressure falls below a predetermined level, and out of communication with said vacuum source upon lapse of a predetermined time therefrom.

4. A treating solution supplying method as defined in claim 1, wherein a period of time for maintaining said sealed space in communication with said vacuum source and a period of time for maintaining said sealed space out of communication with said vacuum source are predetermined, and switching is made repeatedly to place said sealed space in communication with said vacuum source and out of communication with said vacuum source upon lapse of said periods of time.

5. A treating solution supplying method as defined in claim 1, wherein a vacuum pressure inside said vacuum chamber upon communication between said sealed space and said vacuum source is adjusted to and maintained at a predetermined level.

6. A treating solution supplying method as defined in claim 1, wherein an atmosphere drawn from said sealed space into said degassing pipe is separated into a gas and a liquid, said liquid being collected and periodically discharged.

7. A treating solution supplying method for supplying a treating solution to an object under treatment, comprising the steps of: degassing said treating solution supplied through a delivery pipe by causing said treating solution to flow through a fluid passage in a degassing module mounted in an intermediate position of said delivery pipe, said fluid passage being formed of a gas-permeable film material and having an inlet and an outlet communicating with each other, said fluid passage being enclosed in a gas-tight vacuum chamber defining a sealed space communicating with a vacuum source through a degassing pipe; monitoring an inflow of said treating solution from said sealed space to said degassing pipe while said treating solution is supplied to said object under treatment; and providing an alarm when said treating solution flows from said sealed space into said degassing pipe.

8. A treating solution supplying method as defined in claim 7, wherein, when said treating solution flows from said sealed space into said degassing pipe, said sealed space is placed out of communication with said vacuum source, and/or said treating solution stops flowing from said delivery pipe to said degassing module.

9. A treating solution supplying method for supplying a treating solution to an object under treatment, comprising the steps of: degassing said treating solution supplied through a delivery pipe by causing said treating solution to flow through a fluid passage in a degassing module mounted in an intermediate position of said delivery pipe, said fluid passage being formed of a gas-permeable film material and having an inlet and an outlet communicating with each other, said fluid passage being enclosed in a gas-tight vacuum chamber defining a sealed space communicating with a vacuum source through a degassing pipe; and separating an atmosphere drawn from said sealed space into said degassing pipe into a gas and a liquid, said liquid being collected, while said treating solution is supplied to said object under treatment.

10. A treating solution supplying method as defined in claim 9, wherein whether said liquid collected has reached a predetermined quantity is detected, and an alarm is given upon detection of said liquid collected having reached said predetermined quantity.

11. A treating solution supplying method as defined in claim 10, wherein said liquid collected is discharged periodically.

12. A treating solution supplying apparatus for supplying a treating solution to an object under treatment, comprising:
a delivery pipe supplying said treating solution;
a degassing module mounted in an intermediate position of said delivery pipe and including a fluid passage defined by a gas-permeable film material and having an inlet and an outlet communicating with each other, said fluid passage being enclosed in a gas-tight vacuum chamber;
a degassing pipe connecting a sealed space in said vacuum chamber to a vacuum source;
a valve mechanism mounted on said degassing pipe to break a communication between said sealed space and said vacuum source; and
valve control means for controlling opening and closure of said valve mechanism.

13. A treating solution supplying apparatus as defined in claim 12, wherein said valve control means includes a pressure gauge connected to said degassing pipe between said vacuum chamber and said valve mechanism, said valve control means being operable to open said valve mechanism when said pressure gauge detects a vacuum pressure in said degassing pipe falling below a predetermined lower limit, and to close said valve mechanism when said pressure gauge detects said vacuum pressure in said degassing pipe rising above a predetermined upper limit.

14. A treating solution supplying apparatus as defined in claim 12, wherein said valve control means includes a pressure gauge connected to said degassing pipe between said vacuum chamber and said valve mechanism, and a timer, said valve control means being operable to open said valve mechanism when said pressure gauge detects a vacuum pressure in said degassing pipe falling below a predetermined level, and to close said valve mechanism upon lapse of a predetermined time set by said timer therefrom.

15. A treating solution supplying apparatus as defined in claim 12, wherein said valve control means includes a timer, and said valve control means being operable to open and close said valve mechanism repeatedly upon lapse of predetermined periods of time set by said timer.

16. A treating solution supplying apparatus as defined in claim 12, wherein said degassing pipe includes a pressure regulator valve mounted between said valve mechanism and said vacuum source to maintain a vacuum pressure in said degassing pipe at a predetermined level.

17. A treating solution supplying apparatus as defined in claim 12, wherein said degassing pipe includes a trap disposed between said vacuum chamber and said valve mechanism to store a liquid separated from a gas, and a drainpipe having a switch valve to drain said liquid from said trap.

18. A treating solution supplying apparatus as defined in claim 12, wherein said inlet and said outlet of said fluid passage communicate with said delivery pipe through couplings secured to said vacuum chamber, respectively, said couplings being of a resin and secured to said vacuum chamber by welding or bonding.

19. A treating solution supplying apparatus as defined in claim 12, wherein said inlet and said outlet of said fluid passage communicate with said delivery pipe through couplings, respectively, said couplings and connecting portions of said vacuum chamber being of a resin to be integral with each other.

20. A treating solution supplying apparatus as defined in claim 12, wherein said delivery pipe includes connection ends of a resin to connect to said vacuum chamber, said connection ends being welded or bonded directly to or being integral with said inlet and said outlet of said fluid passage, respectively.

21. A treating solution supplying apparatus for supplying a treating solution to an object under treatment, comprising:

a delivery pipe supplying said treating solution;

a degassing module mounted in an intermediate position of said delivery pipe and including a fluid passage defined by a gas-permeable film material and having an inlet and an outlet communicating with each other, said fluid passage being enclosed in a gas-tight vacuum chamber;

a degassing pipe connecting a sealed space in said vacuum chamber to a vacuum source;

detecting means for detecting an inflow of said treating solution from said vacuum chamber to said degassing pipe; and alarm means for notifying of said inflow of said treating solution in response to a detection signal outputted from said detecting means.

22. A treating solution supplying apparatus as defined in claim 21, further comprising emergency shutoff valve means mounted on said degassing pipe and/or said delivery pipe upstream of said degassing module, said emergency shutoff valve means being normally open and closable by said detection signal.

23. A treating solution supplying apparatus as defined in claim 21, wherein said inlet and said outlet of said fluid passage communicate with said delivery pipe through couplings secured to said vacuum chamber, respectively, said couplings being of a resin and secured to said vacuum chamber by welding or bonding.

24. A treating solution supplying apparatus as defined in claim 21, wherein said inlet and said outlet of said fluid passage communicate with said delivery pipe through couplings, respectively, said couplings and connecting portions of said vacuum chamber being of a resin to be integral with each other.

25. A treating solution supplying apparatus as defined in claim 21, wherein said delivery pipe includes connection ends formed of a resin for connection to said vacuum chamber, said connection ends being welded or bonded directly to, or being integral with said inlet and said outlet of said fluid passage, respectively.

26. A treating solution supplying apparatus for supplying a treating solution to an object under treatment, comprising:

a delivery pipe supplying said treating solution;

a degassing module mounted in an intermediate position of said delivery pipe and including a fluid passage defined by a gas-permeable film material and having an inlet and an outlet communicating with each other, said fluid passage being enclosed in a gas-tight vacuum chamber;

a degassing pipe connecting a sealed space in said vacuum chamber to a vacuum source; and a trap mounted in an intermediate position of said degassing pipe to separate from a gas to store said treating solution flowing from said vacuum chamber into said degassing pipe, thereby to prevent said treating solution from flowing toward said vacuum source.

27. A treating solution supplying apparatus as defined in claim 26, wherein said trap includes:

a liquid level detecting means for detecting said treating solution collected in a predetermined quantity therein; and liquid level alarm means for notifying, based on a detection signal outputted from said liquid level detecting means, that said treating solution has collected in said predetermined quantity in said trap.

28. A treating solution supplying apparatus as defined in claim 27, further comprising a drainpipe connected to a bottom of said trap to drain said treating solution collected in said trap, said drainpipe including a switch valve.

29. A treating solution supplying apparatus as defined in claim 26, wherein said inlet and said outlet of said fluid passage communicate with said delivery pipe through couplings secured to said vacuum chamber, respectively, said couplings being of a resin and secured to said vacuum chamber by welding or bonding.

30. A treating solution supplying apparatus as defined in claim 26, wherein said inlet and said outlet of said fluid passage communicate with said delivery pipe through couplings, respectively, said couplings and connecting portions of said vacuum chamber being of a resin to be integral with each other.

31. A treating solution supplying apparatus as defined in claim 26, wherein said delivery pipe includes connection ends of a resin to connect to said vacuum chamber, said connection ends being welded or bonded directly to, or being integral with said inlet and said outlet of said fluid passage, respectively.

* * * * *